US012689783B2

(12) United States Patent (10) Patent No.: US 12,689,783 B2

Miller (45) Date of Patent: Jul. 21, 2026

(54) PARAMETER MODIFICATION FOR SELECTING PERSONALIZED ITEM SETS

(71) Applicant: Adeia Guides Inc., San Jose, CA (US)

(72) Inventor: Kyle Miller, Durham, NC (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/064,310

(22) Filed: Feb. 26, 2025

(65) Prior Publication Data

US 2025/0203141 A1 Jun. 19, 2025

Related U.S. Application Data

(63) Continuation of application No. 18/225,015, filed on Jul. 21, 2023, now Pat. No. 12,267,543, which is a continuation of application No. 18/071,303, filed on Nov. 29, 2022, now Pat. No. 11,750,870, which is a continuation of application No. 17/358,895, filed on Jun. 25, 2021, now Pat. No. 11,539,998, which is a continuation of application No. 16/561,654, filed on Sep. 5, 2019, now Pat. No. 11,076,185.

(51) Int. Cl.
| | |
|---|---|
| *H04N 21/262* | (2011.01) |
| *H04N 21/442* | (2011.01) |
| *H04N 21/482* | (2011.01) |

(52) U.S. Cl.
CPC . *H04N 21/26266* (2013.01); *H04N 21/44204* (2013.01); *H04N 21/4821* (2013.01); *H04N 21/4826* (2013.01)

(58) Field of Classification Search
CPC ....... H04N 21/26266; H04N 21/44204; H04N 21/4821; H04N 21/4826; H04N 21/251; H04N 21/25891; H04N 21/44222; H04N 21/4532; H04N 21/4668; H04N 21/4755; H04N 21/41265; H04N 21/4662; G06F 16/954

USPC .......................................................... 725/54

See application file for complete search history.

(56) References Cited

U.S. PATENT DOCUMENTS

| | | | | |
|---|---|---|---|---|
| 8,117,216 | B1 * | 2/2012 | Chanda | ............... G06F 16/9038 |
| | | | | 707/754 |
| 9,699,490 | B1 * | 7/2017 | Japp | ........................ H04L 67/02 |
| 10,789,637 | B1 * | 9/2020 | Jain | .................... G06Q 30/0631 |
| 2007/0233736 | A1 * | 10/2007 | Xiong | .................... G06Q 30/02 |
| 2008/0294617 | A1 * | 11/2008 | Chakrabarti | ........ G06F 16/9535 |
| | | | | 707/999.005 |
| 2017/0068870 | A1 * | 3/2017 | Lindholm | ............... G06F 16/50 |

FOREIGN PATENT DOCUMENTS

JP 2015106347 A * 6/2015

* cited by examiner

*Primary Examiner* — Cynthia M Fogg

(74) *Attorney, Agent, or Firm* — HG LAW LLP

(57) ABSTRACT

Systems and associated methods are described for providing content recommendations. The system selects a first plurality of subsets of content categories, each subset of content categories comprising a first number of content categories. The subsets are assigned reward scores based on content popularity and duplication. The subset are then iteratively modified to increase the rewards scores. If the reward scores are still low, the process is repeated by selecting a second plurality of subsets of content categories, each subset of content categories comprising a second number of content categories, different from first number.

20 Claims, 6 Drawing Sheets

200

202 Server

204 Media Content Source

206 Media Guidance Data Source

208 Communication Network

210a User Television Equipment

210b User Computer Equipment

210c Wireless User Communications Device

600

602

Select a First Plurality of Subsets of Content Categories, Each Subset of Content Categories Comprising a Number of Content Categories

604

Perform Subset Optimization

606

Are Reward Scores Low ?

Yes

No

608

Modify the number of content categories in each subset

610

End

PARAMETER MODIFICATION FOR SELECTING PERSONALIZED ITEM SETS

CROSS-REFERENCE TO RELATED APPLICATION

This application is a continuation of U.S. patent application Ser. No. 18/225,015, filed Jul. 21, 2023, which is a continuation of U.S. patent application Ser. No. 18/071,303, filed Nov. 29, 2022, now U.S. Pat. No. 11,750,870, which is a continuation of U.S. patent application Ser. No. 17/358, 895, filed Jun. 25, 2021, now U.S. Pat. No. 11,539,998, which is a continuation of U.S. patent application Ser. No. 16/561,654, filed Sep. 5, 2019, now U.S. Pat. No. 11,076, 185, which is are hereby incorporated by reference herein in its entirety their entities.

BACKGROUND

The present disclosure relates to systems and methods for providing media content recommendations, and more particularly to systems and related processes for evolutionary optimization of selection of content categories for a carousel stack and the number of carousels in a stack.

SUMMARY

Media distribution systems often need to provide media content item recommendations. The recommendations are often provided as a stack of carousels, where each carousel displays identifiers of media content from a certain content category (comedy, action, thriller, etc.). In one approach, content categories are selected manually by a human editor. Further, the number of categories for the stack of carousels is also selected manually. However, such an approach will often lead to popular content failing to appear in the carousels (e.g., because the popular item happens to be in a different category from the categories that are in the stack). Additionally, a sub-optimal selection of the carousels and the number of carousels can lead to the same content excessively appearing in multiple carousels, taking up limited user interface space and negatively impacting user experience.

To address these shortcomings, systems and methods are described herein that leverage an evolutionary approach to selection of a subset of content categories (e.g., that are to be displayed as a stack of carousels) with an optimal number of categories and optimal selection of categories.

The content recommendation application begins by selecting a first (e.g., experimental) plurality of subsets of content categories from a large superset of all available categories. Each subset of content categories contains the same first number of categories (e.g., 40 categories). For each category, in the plurality of subsets, the content recommendation application selects appropriate recommended content items (e.g., for content category action-actions movies and TV shows may be selected). In some embodiments, the recommended content items are selected based on what content items are available for consumption currently, while in some implementations the recommended content items are selected based on what content items will be available in the future (e.g., in a day or in a week).

The content recommendation application may calculate a reward score for each subset of content categories. The reward score of a subset of categories may be based on combined popularity scores of the recommended items in each category and based on the number of duplicative content items in the subset of categories. After the initial selection, the content recommendation application modifies the first plurality of subsets of content categories, using an evolutionary technique, to maximize the reward scores. For example, the content recommendation application may readjust the first plurality of subsets of content categories by modifying the subsets by dropping the lowest-performing subsets of content categories, while modifying or combining (e.g., by crossing together) high-performing subsets of categories and reevaluating the reward scores.

When the reward scores of the first plurality of subsets of content categories stop improving, the content recommendation application may analyze the outcome. For example, if the reward scores are still below a certain threshold, the content recommendation application selects a second plurality of subsets of content categories, each subset of content categories comprising a second number of content categories, different from the first number (e.g., 30 categories).

The content recommendation application repeats the steps of selecting recommended content items, calculating a reward score, and modifying the second plurality of subsets of content categories using the evolutionary technique as described above with respect to the first plurality of subsets of content categories. In some embodiments, this process may be repeated for a third number of content categories, fourth number of content categories, etc. In some embodiments, the process may be repeated until the highest possible reward scores are obtained. In this way, the optimal carousels, and the optimal number of content carousels are selected for a stack of carousels for presentation on a user device. The technique allows for presentation of the most popular items without excessive duplication.

The content recommendation application may then generate for display identifiers for recommended content items of a subset of content categories of the second plurality of subsets of content categories that has the highest reward score. For example, the content recommendation application may generate these identifiers as part of an EPG (electronic programming guide) of a cable system (e.g., Cox™ or Verizon™), or as part of an OTT (over-the-top) media streaming application (e.g., Netflix™ or Amazon™). For example, the identifiers for recommended content items may be displayed as a stack of carousels, each carousel including identifiers of content of a certain category.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
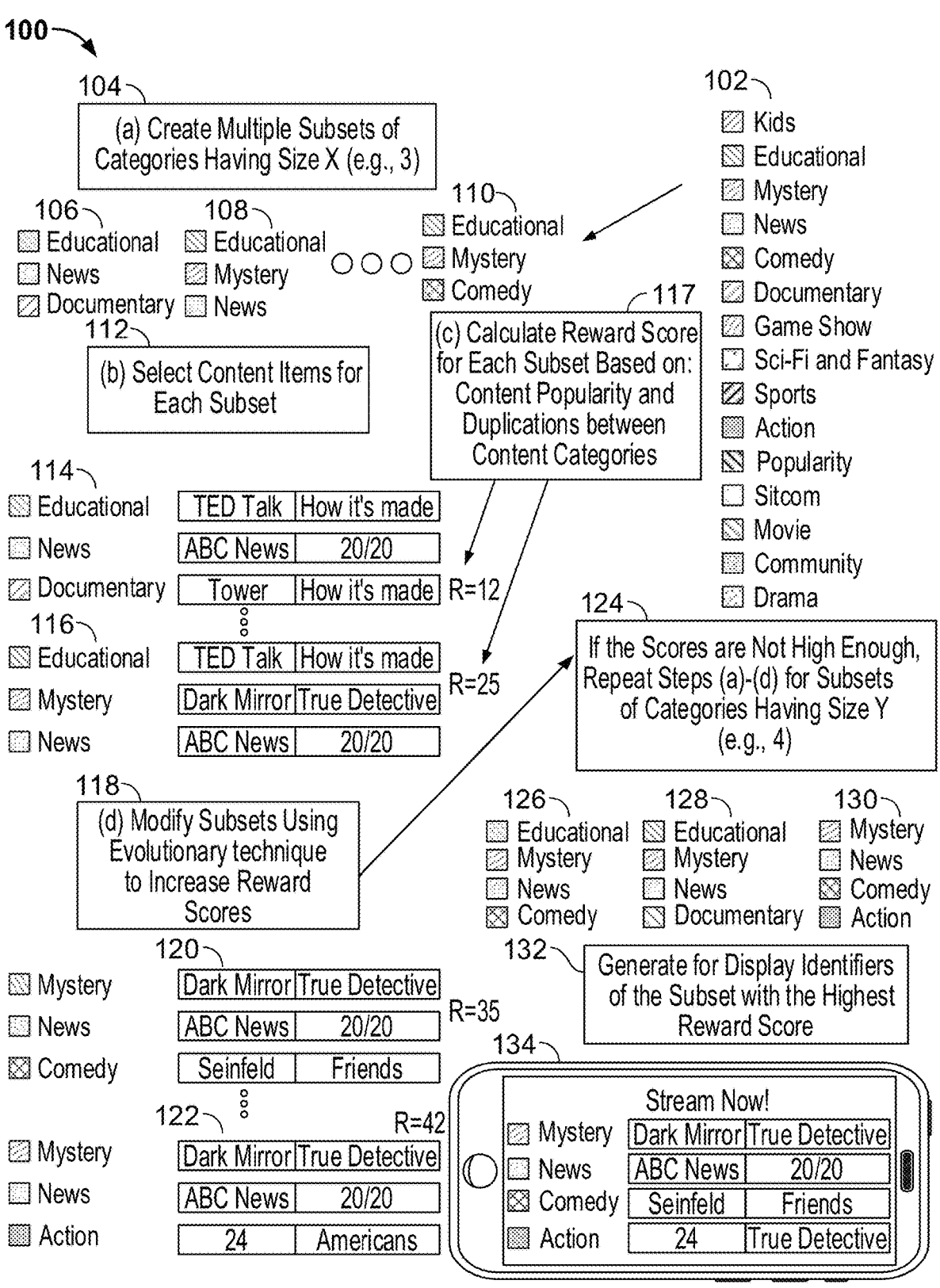
FIG. 1 depicts an illustrative scenario for a content recommendation application providing media content recommendations, in accordance with some embodiments of the disclosure.

FIG. 1 depicts an illustrative scenario 100 for a content recommendation application providing media content recommendations. Media content may refer to any kind of video, audio, text, or multimedia content, or any combination thereof. For example, a media content item may be a TV show, a movie, a song, a podcast, a video game, any other type of media or any combination thereof.

In particular, FIG. 1 shows the operation of a content recommendation application. In some embodiments, the content recommendation application may be executing on a server of an OTT content provider (e.g., Netflix, YouTube, Pandora) that is generating a recommendation screen for a particular use of the OTT system. In another example, the content recommendation application is executing on a media device of the user. In another example, the content recommendation application is executing on equipment of a cable company for providing an EPG.

At step 102, the content recommendation application may access a superset of content categories (e.g., kids, educational, mystery, etc.) It should be noted that while element 102 depicts certain categories, any set of categories can be used. At 104, the content recommendation application creates multiple subsets of categories 106-110, each having the same first size (e.g., each having three categories) by selecting categories from set 102. The first size may be of any size (e.g., each subsets may include 10, 20, 35, 40, or 50 categories).

For example, subset 106 may include categories {educational, news, documentary}, subset 108 may include categories {educational, mystery, news}, and subset 110 may include categories {educational, mystery, comedy}. While three subsets are shown, any number of subsets may be created.

At 112, the content recommendation application may select recommended content items for each subset 106-110. In some embodiments, the content recommendation application may use a recommendation engine to retrieve recommended content items (e.g., via an API call). The content recommendation application may use any of the recommendation engines and recommendation techniques as described in U.S. Pat. No. 6,388,714 and in U.S. Pat. No. 6,756,997 (both of which are hereby incorporated by reference herein in their entirety). In some embodiments, the recommended content items are selected based on content that is currently available. In some embodiments, the content recommendation application may also specify a future time period in its call to the recommendation engine. In this case, the recommended content items are selected based on content that will be available in the specified future time period (e.g., in 3 days).

For example, for subset 106, the content recommendation application may select recommended content items 114. As shown, the content recommendation application selected content items "TED Talk" and "How It's Made" for the educational category, content items "ABC NEWS" and "20/20" for news category, and content items "Tower" and "How It's Made" for documentary category. In another example, for subset 108, the content recommendation application may select recommended content items 116. As shown, the content recommendation application selected content items "TED talk" and "How It's Made" for the educational category, and content items "Dark Mirror" and "True Detective" for the mystery category, and content items "ABC NEWS" and "20/20" for the news category. Content items may similarly be selected for other subsets in addition to or instead of subsets 106-110.

At 117, content recommendation application may calculate a reward score for each subset 106-110. For example, the scores may be based on the popularity of each content item selected for that subset and based on amount of duplication of content items between categories in the same subset. In some embodiments, the score may increase based on popularity, but decreases based on the incidence of duplication. In some embodiments, a target duplication rate may be established (e.g., 5% contents items being duplicated may be the desired duplication rate), and the reward score may be modified based on how close the duplication rate comes to the target rate. The popularity may be calculated based on expected or real viewership of each content item; for example, the viewership numbers may be added and normalized based on the number of content items selected for the category. In some embodiments, the reward score may be adjusted based on how many content items are selected for each category. For example, the reward scores can be decreased when less than a threshold number of content items (e.g., less than five) are selected for a category.

As shown, content items 116 received a reward score of 25, which is higher than the reward score of 12 calculated for content items 114. For example, content items 116 may have received the higher score due to including more popular content items (e.g., "Dark Mirror"), while the content items 116 may have received a lower score due to including only lower-rated content items and the content item "How It's Made" being a duplicate that appears in both the educational and documentary categories.

At step 118, the content recommendation application may use an evolutionary algorithm to modify subsets 106-110 to maximize the reward scores of subsets 106-110. The sets may be modified, e.g., by discarding the lowest performing subsets (e.g., subsets with lowest reward score) and replacing them with an adjusted version of higher performing sets. The adjustment may be replacing one of the categories in a subset with another category. For example, subset 122 may be an adjusted version of subset 106 where the education category was replaced with action category. The adjustment may also be a combination of two high performing subsets, e.g., subset 120 may be a merged version of subsets 108 and 110 (e.g., where some categories for subset 120 are picked from subset 108 and some from subset 110).

As shown, the first subset of categories now includes subsets 120-122, and the rewards score for the subsets increased to 35 and 42, respectively. The evolutionary modification may be repeated until reward scores stop improving (e.g., when scores of last three iterations are within 5% of each other).

At 124, the content recommendation application may check if the process of steps 106-118 resulted in a sufficiently high reward score (e.g., a score below 100). If not, the content recommendation application may repeat steps 106-118, but the subsets will include a different number of categories (e.g., four). For example, as shown, a second plurality of subsets of categories 126-130 may be selected, each subset having four categories. This second plurality of subsets may be modified as shown in steps 112, 117, and 118 to increase the reward score as much as possible. In some embodiments, the content recommendation application may repeat step 124 multiple times until a reward score is achieved that is above a threshold. In some embodiments, application may repeat step 124 multiple times and select the size of the subsets that resulted in the highest score. For example, the content recommendation application may try all suitable sizes of a subset (e.g., 2-50) and pick the one that works best.

At 132, the content recommendation application may display the identifiers of the content items of the highest scoring subset. As shown, subset 130, which includes categories {Mystery; News; Comedy; and Action}, was identified as a subset that resulted in the highest rewards score. As shown, the identifiers of content items of subset 130 are displayed on user device 134 in a stack of carousels arrangement. For example, the user interface of device 134 shows four carousels, (one for each of the categories of subset 130). Each carousel includes identifiers for content items identified during step 112 for subset 130. That is, the carousel "Mystery" includes identifiers for "Dark Mirror" and "True Detective," the carousel "News" includes identifiers for "ABC News" and "20/20," the carousel "Comedy" includes identifiers for "Seinfeld" and "Friends," and carousel "Action" includes identifiers for "24," and "True Detective."

The carousels may appear as stacked on top of each other. In some embodiments, the identifiers may be textual, or may include visual elements (e.g., promotion materials for the item, such as a poster or screenshot). When one of the identifiers is selected, the corresponding content item may be shown on the display of device 134 (e.g., via a streaming service or via a broadcast).

Figure 2:
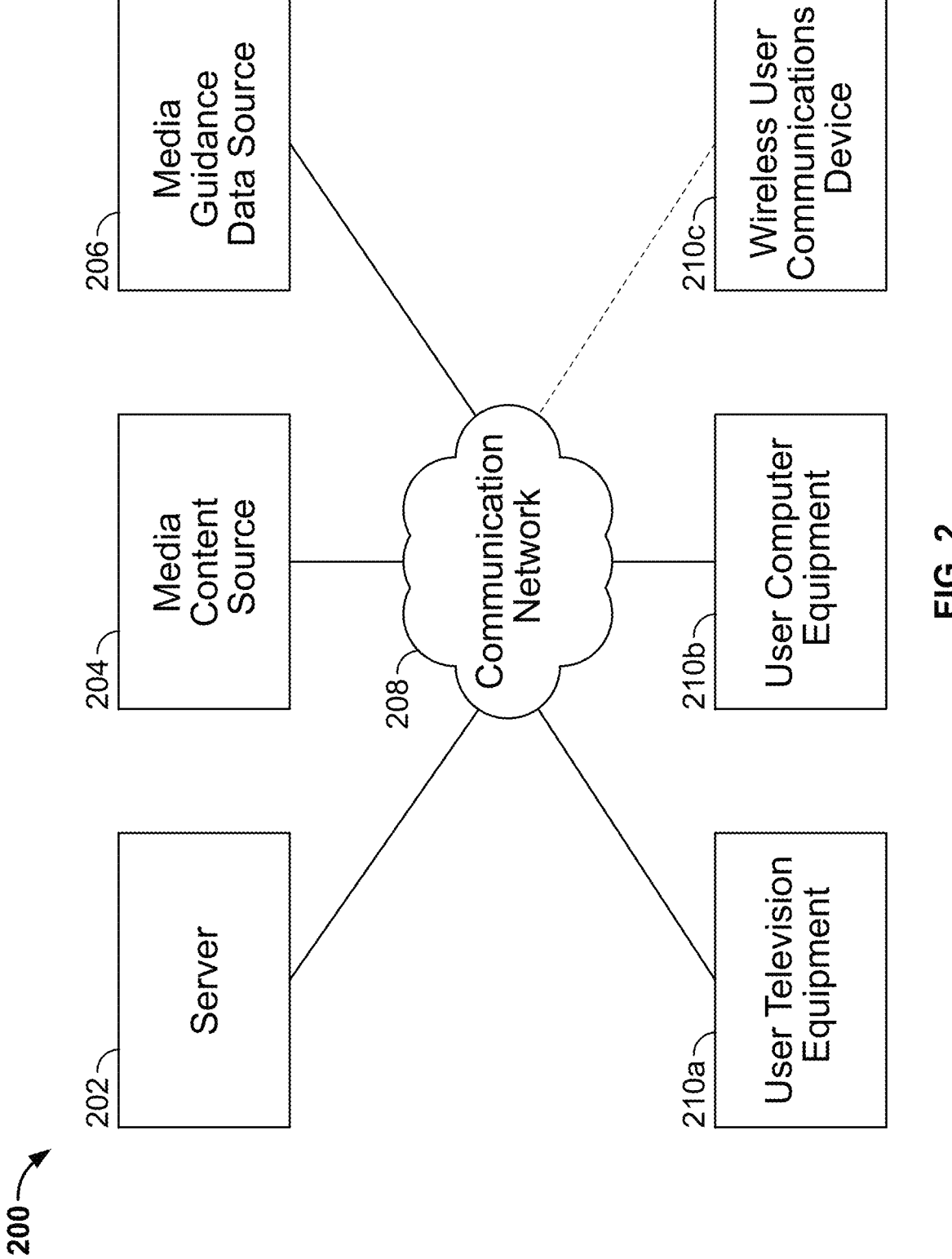
FIG. 2 shows an illustrative block diagram of a system hosting the media delivery application, in accordance with some embodiments of the disclosure.

FIG. 2 shows an illustrative block diagram of a system 200 for displaying content based on event monitoring, in accordance with some embodiments of the disclosure. In various aspects, system 200 includes one or more of server 202, media content source 204, media guidance data source 206, communication network 208, and one or more computing devices 210, such as user television equipment 210*a* (e.g., a set-top box), user computer equipment 210*b* (e.g., a laptop), and/or wireless user communications device 210*c* (e.g., a smartphone device). Although FIG. 2 shows one of each component, in various examples, system 200 may include fewer than the illustrated components and/or multiples of one or more illustrated components. Communication network 208 may be any type of communication network, such as the Internet, a mobile phone network, mobile voice or data network (e.g., a 4G or LTE network), cable network, public switched telephone network, or any combination of two or more of such communication networks. Communication network 208 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 208 communicatively couples various components of system 200 to one another. For instance, server 202 may be communicatively coupled to media content source 204, media guidance data source 206, and/or computing device 210 via communication network 208.

In some examples, media content source 204 and media guidance data source 206 may be integrated as one device. Media content source 204 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Media content source 204 may be the originator of content (e.g., a television broadcaster, a Webcast provider, etc.) or may not be the originator of content (e.g., an on-demand content provider, an Internet provider of content of broadcast programs for downloading, etc.). Media content source 204 may include cable sources, satellite providers, on-demand providers, Internet providers, over-the-top content providers, or other providers of content. Media content source 204 may also include a remote media server used to store different types of content (e.g., including video content selected by a user) in a location remote from computing device 210. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 204 and media guidance data source 206 may provide content and/or media guidance data to computing device 210 and/or server 202 using any suitable approach. In some embodiments, media guidance data source 206 may provide a stand-alone interactive television program guide that receives program guide data via a data feed (e.g., a continuous feed or trickle feed). In some examples, media guidance data source 206 may provide program schedule data and other guidance data to computing device 210 on a television channel sideband, using an in-band digital signal, an out-of-band digital signal, or any other suitable data transmission technique.

As described in further detail below, server 202 manages the communication of a live content stream (e.g., a live sporting event broadcast, a live news broadcast, or the like) and recorded streams from media content source 204 to computing device 210 via communication network 208. For instance, in some embodiments, content from media content source 204 and/or guidance data from media guidance data source 206 may be provided to computing device 210 using a client/server approach. In such examples, computing device 210 may pull content and/or media guidance data from server 202 and/or server 202 may push content and/or media guidance data to computing device 210. In some embodiments, a client application residing on computing device 210 may initiate sessions with server 202, media content source 204, and/or media guidance data source 206 to obtain content and/or guidance data when needed, e.g., when the guidance data is out of date or when computing device 210 receives a request from the user to receive content or guidance data. In various aspects, server 202 may also be configured to detect events within the live content stream and, based on the detected events, control the display of content and/or navigation menu options via computing device 210. Additionally, although FIG. 2 shows media content source 204 and media guidance data source 706 as separate from server 202, in some embodiments, media content source 204 and/or media guidance data source 206 may be integrated as one device with server 202.

Content and/or media guidance data delivered to computing device 210 may be over-the-top (OTT) content. OTT content delivery allows Internet-enabled user devices, such as computing device 210, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include FACEBOOK, AMAZON, YOU-TUBE, NETFLIX, and HULU, which provide audio and video via IP packets. YouTube is a trademark owned by Google LLC; Netflix is a trademark owned by Netflix, Inc.; Hulu is a trademark owned by Hulu, LLC; Facebook is a trademark owned by Facebook, Inc.; and Amazon is a trademark owned by Amazon.com, Inc. OTT content providers may also include any other OTT content provider. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 210.

Figure 3:
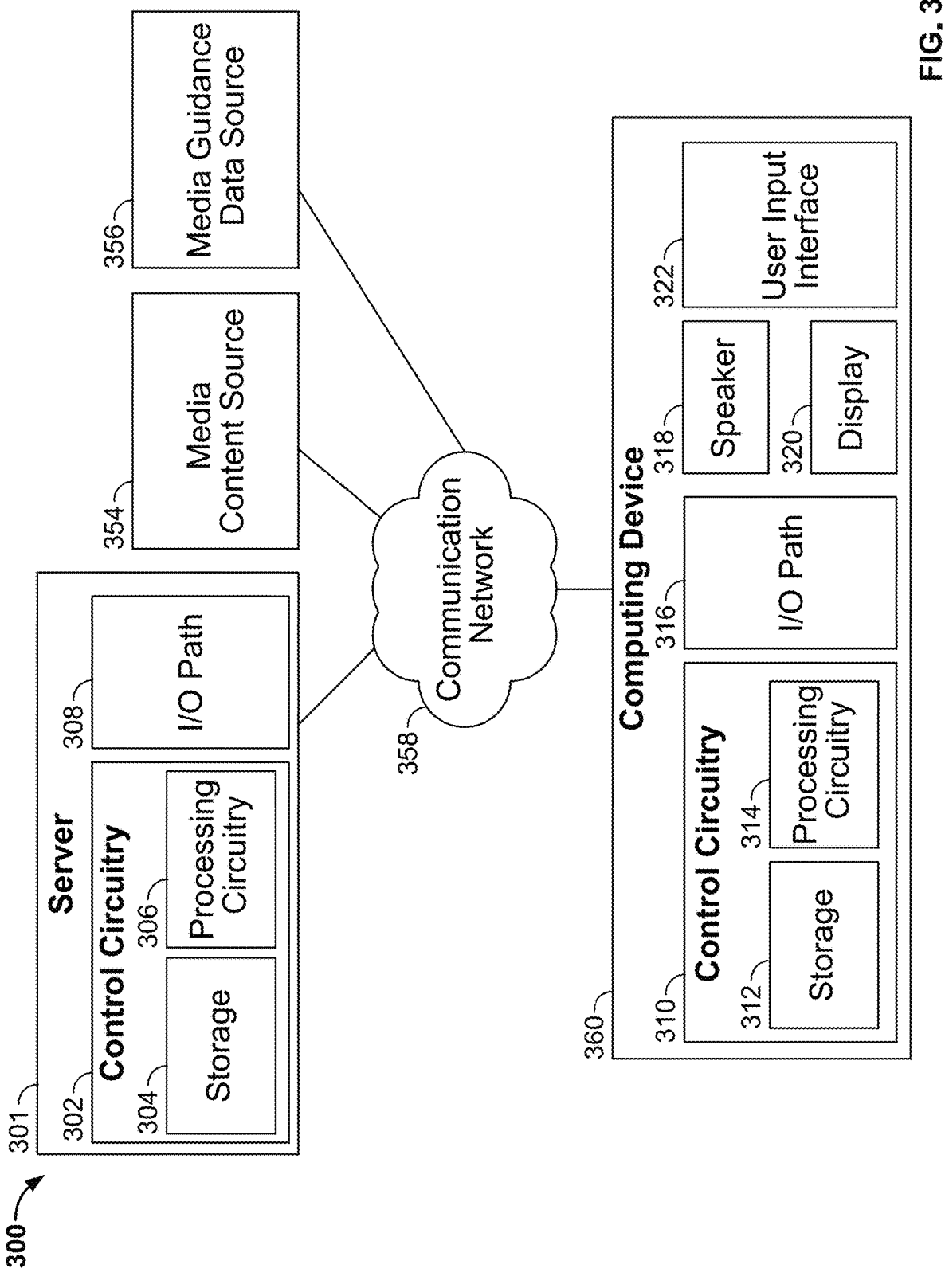
FIG. 3 is an illustrative block diagram showing additional details of a system hosting the media delivery application, in accordance with some embodiments of the disclosure.

FIG. 3 is an illustrative block diagram showing additional details of the system 300 (which may be the same as system 200 of FIG. 7), in accordance with some embodiments of the disclosure. In particular, server 301 (e.g., the same server as server 202) includes control circuitry 302 and I/O path 308, and control circuitry 302 includes storage 304 and processing circuitry 306. Computing device 360 (e.g., one or more of devices 210a, 210, and 210c) includes control circuitry 310, I/O path 316, speaker 318, display 320, and user input interface 322. Control circuitry 310 includes storage 312 and processing circuitry 314. Control circuitry 302 and/or 310 may be based on any suitable processing circuitry such as processing circuitry 306 and/or 314. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 304, storage 312, and/or storages of other components of system 300 (e.g., storages of media content source 354, media guidance data source 356, and/or the like) may be an electronic storage device. In some embodiments, media content source 354 may be the same as media content source 204. In some embodiments, media guidance data source 356 may be the same as media content source 206. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Each of storage 304, storage 312, and/or storages of other components of system 300 may be used to store various types of content, media guidance data, and or other types of data. Non-volatile memory may also be used (e.g., to launch a boot-up routine and other instructions). Cloud-based storage may be used to supplement storages 304, 312 or instead of storages 304, 312. In some embodiments, control circuitry 302 and/or 310 executes instructions for a content recommendation application stored in memory (e.g., storage 304 and/or 312). Specifically, control circuitry 302 and/or 310 may be instructed by the content recommendation application to perform the functions discussed herein. In some implementations, any action performed by control circuitry 302 and/or 310 may be based on instructions received from the content recommendation application. For example, the content recommendation application may be implemented as software or a set of executable instructions that may be stored in storage 304 and/or 312 and executed by control circuitry 302 and/or 310. In some embodiments, the content recommendation application may be a client/server content recommendation application where only a client content recommendation application resides on computing device 360, and a server content recommendation application resides on server 301.

The content recommendation application may be implemented using any suitable architecture. For example, it may be a stand-alone content recommendation application wholly implemented on computing device 360. In such an approach, instructions for the content recommendation application are stored locally (e.g., in storage 312), and data for use by the content recommendation application is downloaded on a periodic basis (e.g., from an out-of-band feed, from an Internet resource, or using another suitable approach). Control circuitry 310 may retrieve instructions for the content recommendation application from storage 312 and process the instructions to perform the functionality described herein. Based on the processed instructions, control circuitry 310 may determine what action to perform when input is received from user input interface 322.

In client/server-based embodiments, control circuitry 310 may include communication circuitry suitable for communicating with a content recommendation application server (e.g., server 301) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, a wireless modem for communication with other equipment, or any other suitable communication circuitry. Such communication may involve the Internet or any other suitable communication networks or paths (e.g., communication network 358). In some embodiments, communication network 358 may be the same as network 208. In another example of a client/server-based application, control circuitry 310 runs a web browser that interprets web pages provided by a remote server (e.g., server 301). For example, the remote server may store the instructions for the application in a storage device. The remote server may process the stored instructions using circuitry (e.g., control circuitry 302) and generate the displays discussed above and below. Computing device 360 may receive the displays generated by the remote server and may display the content of the displays locally via display 320. This way, the processing of the instructions is performed remotely (e.g., by server 301) while the resulting displays, such as the display windows described elsewhere herein, are provided locally on computing device 360. For example, computing device 360 may include display circuitry (e.g., video card circuitry or combination motherboard and video card circuitry) configured to generate for display the display windows. Computing device 360 may receive inputs from the user via input interface 322 and transmit those inputs to the remote server for processing and generating the corresponding displays.

A user may send instructions to control circuitry 302 and/or 310 using user input interface 322. User input interface 322 may be any suitable user interface, such as a remote control, trackball, keypad, keyboard, touchscreen, touchpad, stylus input, joystick, voice recognition interface, or other user input interfaces. User input interface 322 may be integrated with or combined with display 320, which may be a monitor, television, liquid crystal display (LCD), electronic ink display, or any other equipment suitable for displaying visual images.

Server 301 and computing device 360 may receive content and data via input/output (hereinafter "I/O") path 308 and 316, respectively. For instance, I/O path 316 may include circuitry that includes one or more of communication port configured to receive a live content stream from server 301 and/or media content source 354 via a communication network 358. Storage 312 may be configured to buffer the received live content stream for playback, and display 320 may be configured to present the buffered content, navigation options, alerts, and/or the like via a primary display window and/or a secondary display window. I/O paths 308, 316 may provide content (e.g., a live stream of content, broadcast programming, on-demand programming, Internet content, content available over a local area network (LAN) or wide area network (WAN), and/or other content) and data to control circuitry 302, 310. Control circuitry 302, 310 may be used to send and receive commands, requests, and other suitable data using I/O paths 308, 316. I/O paths 308, 316 may connect control circuitry 302, 310 (and specifically processing circuitry 306, 314) to one or more communication paths (described below). I/O functions may be provided by one or more of these communication paths but are shown as single paths in FIG. 3 to avoid overcomplicating the drawing.

Figure 4:
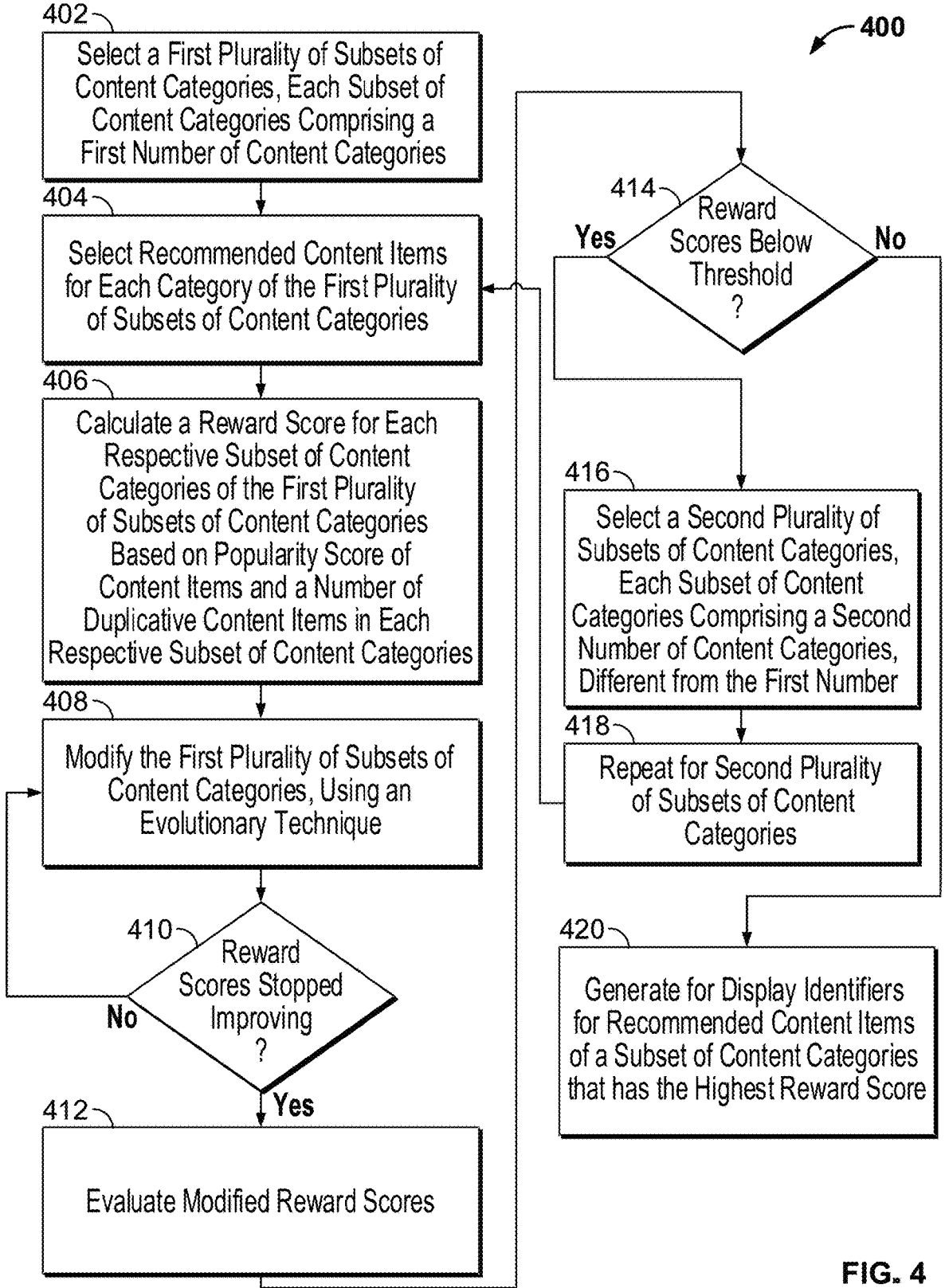
FIG. 4 depicts an illustrative flowchart of a process for providing media content recommendations, in accordance with some embodiments of the disclosure.

Having described systems 200 and 300, reference is now made to FIG. 4, which depicts an illustrative flowchart of process 400 for providing media content recommendations that may be implemented by using systems 200 and 300, in accordance with some embodiments of the disclosure. In various embodiments, the individual steps of process 400 may be implemented by one or more components of systems 200 and 300. Although the present disclosure may describe certain steps of process 400 (and of other processes described herein) as being implemented by certain components of systems 200 and 300, this is for purposes of illustration only, and it should be understood that other components of systems 200 and 300 may implement those steps instead. For example, steps of process 400 may be executed by server 303 and/or by computing device 360 to provide content recommendations.

At step 402, control circuitry 310 selects a first plurality (e.g., 10) of subsets of content categories, each subset of content categories comprising a first number of content categories (e.g., 40). In some embodiments, the subsets are initially selected at random from a set of available categories stored at media guidance data sources 206. In some embodiments, the most popular categories overall are selected.

At step 404, control circuitry 310 selects recommended content items for each category that is found in at least one of the selected subsets of categories. For example, control circuitry 310 may issue an API call to media guidance data sources 206 via network 208 to provide recommended content items for each content category. In some embodiments, the content items are selected based on current availability. In some embodiments, the content items are selected based on future availability (e.g., wherein the control circuitry 310 specifies the time period). For example, control circuitry 310 may request content recommendation for tomorrow, or for next week, or for any other future time period. In some embodiments, the recommended content items are selected for an individual user. In some embodiments, the recommended content items are selected for a group of users (e.g., a group of users that share a demographic, e.g., all male users aged 18-47).

At 406, control circuitry 310 may calculate a reward score for each subset of the first plurality of subsets. The reward score may be computed based on the popularity score of the content items and a number of duplicative content items in each respective subset of content categories. For example, the reward score may be increased for a respective subset proportionally to the popularity score of each content item selected for that subset. For example, the expected or recorded viewership of each content may be summed and normalized based on the total number of unique content items. In some embodiments, other factors may be used to compute the reward score (e.g., a low number of items selected for a category may lower a reward score of the subset that includes that category).

In some embodiments, control circuitry 310 may modify the reward score of the respective subset in reverse proportion to the amount of duplicative content items in the respective subset. For example, for a respective subset, control circuitry 310 may calculate the percentage or fraction of content items that were selected for more than one content category of that subset. The reward score may be scaled down proportionally to the percentage or fraction. For example, if 10% of the content items are non-unique, the reward score may be lowered by 10%. In some embodiments, the reward score may be scaled based on how closely the percentage or fraction matches the predetermined target percentage or fraction of duplication. For example, if the desired amount of duplication is 5%, the observed duplication rate of 7% may be penalized similarly to an observed duplication rate of 3%, because both are 2% away from the target.

At 408, control circuitry 310 may modify the first plurality of subsets using an evolutionary technique to maximize the reward score. For example, subsets can be iteratively modified with the goal of achieving a reward score increase. An exemplary evolutionary technique is described below in relation to FIG. 5.

At 410, control circuitry 310 may check if the reward scores have stopped improving due to operations of the evolutionary technique. For example, while step 410 is being performed, control circuitry 310 may maintain a historical high rewards (e.g., the value of the highest reward score for a subset is stored in storage 312) for each iteration cycle. After each repetition of steps 410, control circuitry 310 may compare all historical high evaluation metrics of previous cycles. For example, the last five cycles may have resulted in historical high evaluation rewards scores of {40, 50, 55, 55, 55}. Because last three historical high rewards scores ({55, 55, 55}) are not increasing, control circuitry 310 may determine that rewards scores has stopped improving. In some embodiments, improvements that are lower than a certain margin (e.g., less than 1%) may be treated the same as historical high evaluation metrics that has stopped increasing. For example, the last five cycles may have resulted in historical high rewards scores {40, 50, 55, 56, 57}. Because the last three historical high rewards scores ({55, 56, 57}) are not increasing by a sufficiently high margin, control circuitry 310 may determine that rewards scores have stopped improving.

At 412, control circuitry 310 may further evaluate the first plurality of content categories that has been subject to the evolutionary technique at step 410. For example, control circuitry 310 may compare the reward score of the highest scoring subset of categories. In some embodiments, circuitry 310 may compare the reward score of the highest scoring subset of categories to a predetermined or dynamic threshold. In some embodiments, the threshold may be selected based on steps 402-410 performed for subsets with a different number of categories (e.g., as will be explained in relation to FIG. 6).

At 414, if the reward score is sufficiently high, control circuitry 310 may proceed to 420. Otherwise, control circuitry 310 proceeds to step 416. At 416, control circuitry 310 selects a different number of categories than was previously used in step 402. For example, if subsets in step 402 had 40 content categories, control circuitry 310 may select the number "30." In some embodiments, all numbers that were tried are stored, and control circuitry 310 selects a new number not previously used. Then, control circuitry 310 selects a second plurality (e.g., 10) of subsets of content categories, each subset of content categories comprising a second number of content categories (e.g., 30).

At 418, control circuitry 310 may repeat steps 404-414 for the second plurality of subsets. Eventually, control circuitry 310 will identify an optimal number of the content categories for each subset and the evaluation at step 414 will succeed. In that case, as described above, control circuitry 310 will proceed to step 420.

Control circuitry 310 may, at step 420, generate for display identifiers based on the final plurality of subsets of content categories. For example, control circuitry 310 may generate for display identifiers of for recommended content items of a subset of content categories of the second plurality of subsets of content categories that has the highest reward score. For example, the identifiers of recommended content items may be generated for display on display 320 by server 301 or media content source 354. In some embodiments, the user may select content for consumption by interacting with the identifiers (for example, by clicking on the identifiers). Identifiers may be simple text identifiers, or graphical identifiers that include cover art and/or other data (release date, actors list, etc.). In some embodiments, the final set of recommended content items may be used for other purposes. For example, content that is predicted to be requested by a large demographic may be placed in edge distribution servers for faster delivery based on predicted demand for some content items.

Figure 5:
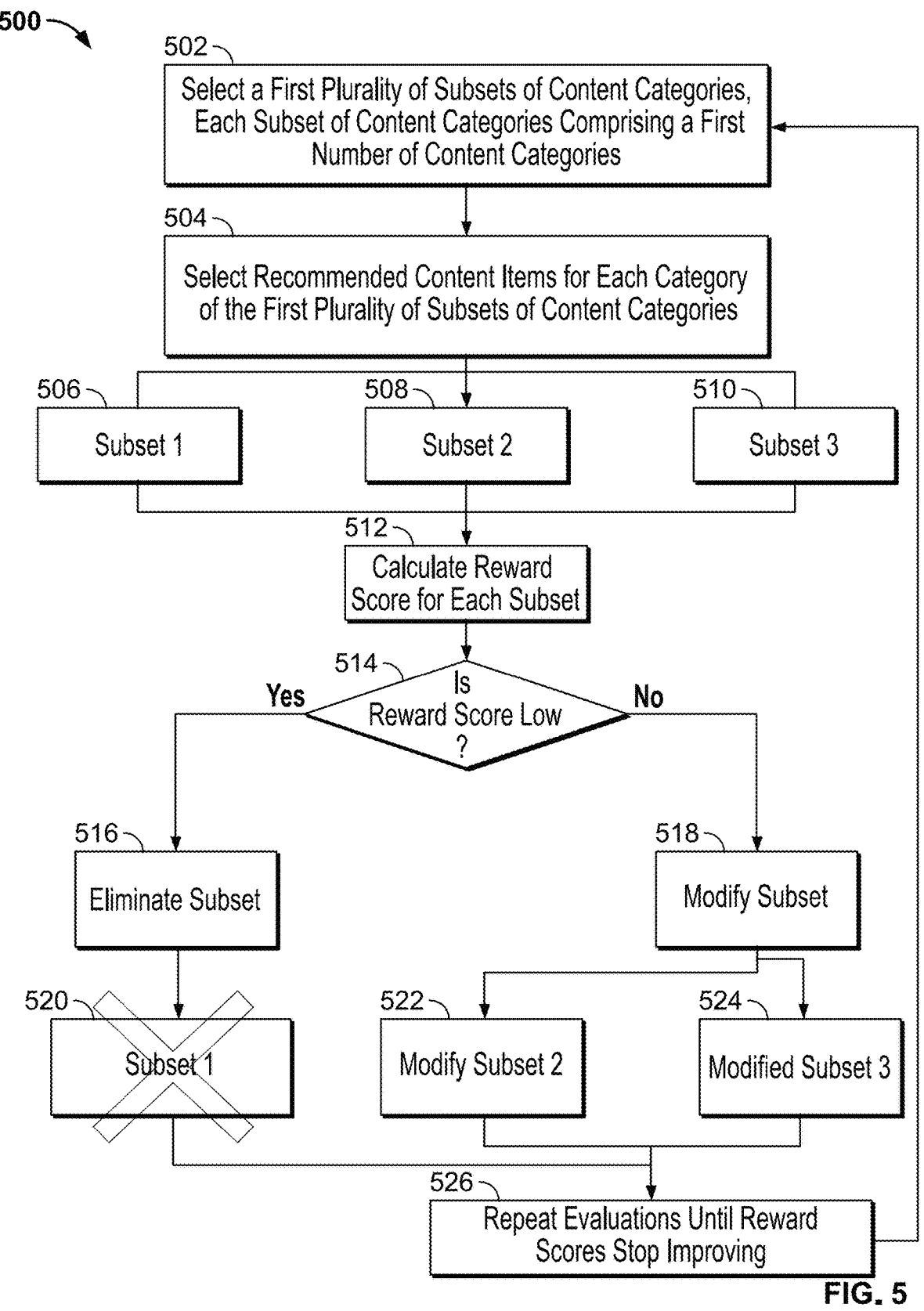
FIG. 5 depicts an illustrative flowchart of a process for maximizing reward scores, in accordance with some embodiments of the disclosure.

FIG. 5 depicts an illustrative flowchart of process 500 for modifying a plurality of subsets that may be implemented by using systems 200 and 300, in accordance with some embodiments of the disclosure. In various embodiments, individual steps of process 500 may be implemented by one or more components of systems 200 and 300. Although the present disclosure may describe certain steps of process 500 (and of other processes described herein) as being implemented by certain components of systems 200 and 300, this is for purposes of illustration only, and it should be understood that other components of systems 200 and 300 may implement those steps instead. For example, steps of process 500 may be executed by server 202 and/or by computing device 360 to provide content recommendations. In some embodiments, control circuitry 310 may use process 500 as part of process 400 of FIG. 4 (e.g., in addition to or instead of steps 410-412).

At step 502, control circuitry 310 may select a first plurality of subsets of content categories, each subset of content categories comprising a first number of content categories (e.g., as described in step 402). In some embodiments, this may be done at random. Any number of subsets of content categories may be generated. At step 504, a set of media content items is selected for each content category. For example, step 504 may result in generation of subset 1 at step 506, subset 2 at step 508, and subset 3, at step 510. While only three subsets are shown, any number of subsets may be generated. For example, subsets may be generated as described with relation to subsets 106-110 in FIG. 1.

At step 512, control circuitry 310 calculates reward scores for each subset generated in steps 506-510. For example, the method described above in step 406 may be used to calculate reward scores.

Steps 514-524 may be performed for each subset (e.g., for subsets 106, 108, and 110 of FIG. 1). At 514, control circuitry 310 may check if the reward score for a particular subset is low (e.g., low compared to other scores). For example, control circuitry 310 may select only the subsets that scored the lowest for replacement. In some embodiments, control circuitry 310 may select all subsets that scored below a threshold for replacement. If the subsets' score is not low, then, at step 518, control circuitry 310 may keep that subset in storage 312. At 516, subsets with a low reward score (e.g., the lowest reward score) may be eliminated. For example, at 520, control circuitry 310 may completely delete the lowest scoring subset from storage 312. Additionally, at 518, control circuitry 310 may generate a replacement subset in any one of the ways described at step 522 or step 524 below.

For example, at 522, control circuitry 310 may generate a new subset by mutating one of the other subsets. For example, control circuitry 310 may construct new modified subset 2 by removing one or more of the content categories from subset 2 and replacing it or them with a new category or categories (e.g., as shown in FIG. 1 in element 118). At 524, control circuitry 310 may generate a new subset by merging two other subsets (e.g., as shown in FIG. 1). For example, to construct a modified subset 3, control circuitry 310 may combine some categories from subset 2 and from subset 3.

At 526, control circuitry 310 may repeat steps 502-524 for newly replaced subsets until reward scores stop improving (e.g., if the historically high reward scores stagnate over a certain number of cycles).

Figure 6:
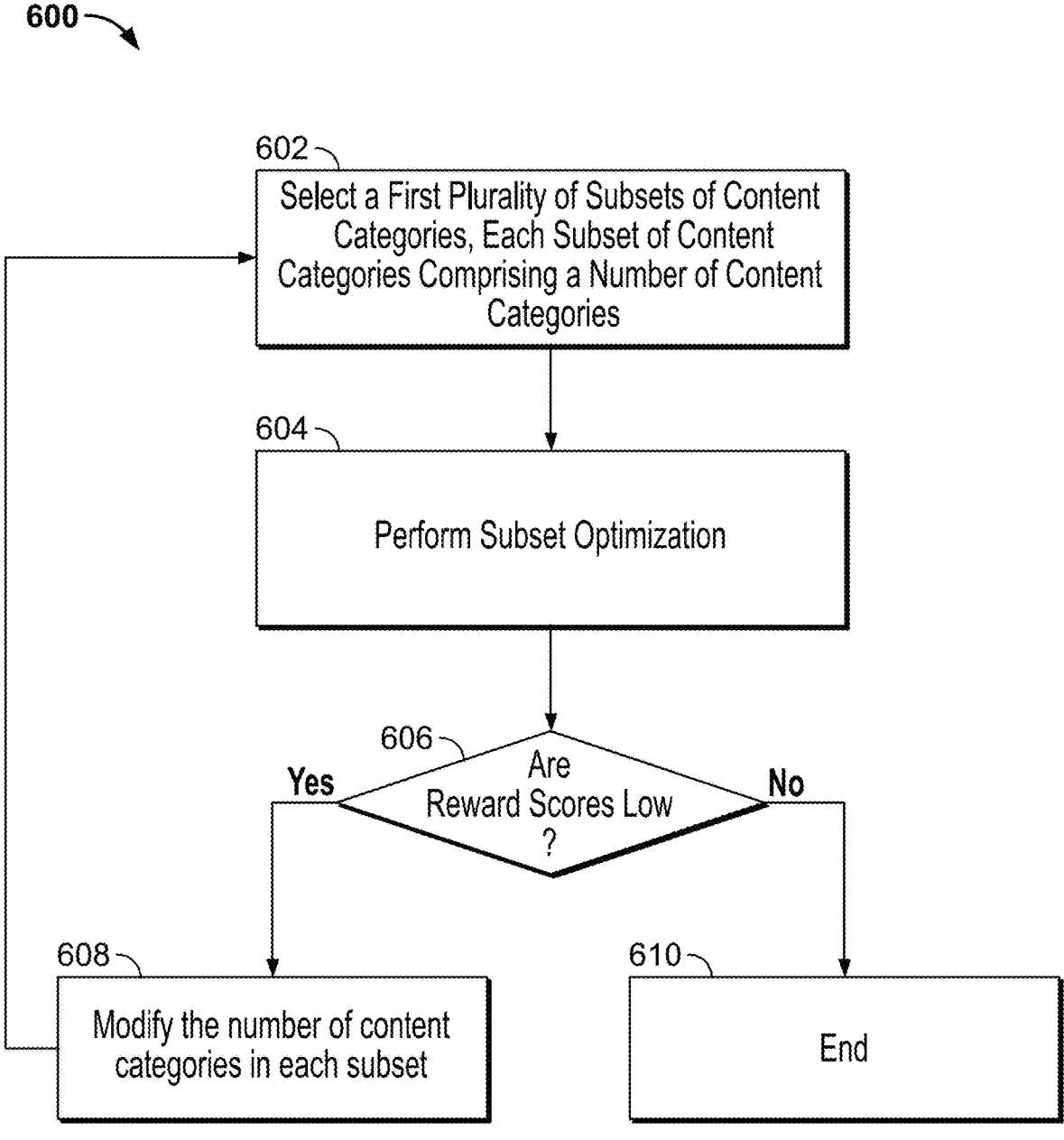
FIG. 6 depicts an illustrative flowchart of a process for determining an optimal number of categories in a subset of content categories, in accordance with some embodiments of the disclosure.

FIG. 6 depicts an illustrative flowchart of process 600 for determining an optimal number of categories in a subset of content categories that may be implemented by using systems 200 and 300, in accordance with some embodiments of the disclosure. In various embodiments, the individual steps of process 600 may be implemented by one or more components of systems 200 and 300. Although the present disclosure may describe certain steps of process 600 (and of other processes described herein) as being implemented by certain components of systems 200 and 300, this is for purposes of illustration only, and it should be understood that other components of systems 200 and 300 may implement those steps instead. For example, the steps of process 600 may be executed by server 302 and/or by computing device 360 to provide content recommendations. In some embodiments, control circuitry 310 may use process 600 as a part of process 400 of FIG. 4 (e.g., in addition to or instead of steps 414-418).

At 602, control circuitry 310 may select a first plurality of subsets of content categories, each subset of content categories comprising a first number of content categories (e.g., as described in step 402), each category having a first number (e.g., N) categories. At 604, control circuitry 310 may modify the first plurality of subsets to maximize the reward scores using an evolutionary technique (e.g., as described in FIG. 5).

After the rewards scores are maximized for value N, control circuitry 310 checks if a sufficiently high reward score is achieved at step 606. For example, the reward score may be compared to a pre-set threshold. In another example, control circuitry 310 may keep the highest reward score obtained for different values of N. In this case, the current highest reward score of a subset would need to exceed the historically high value of the rewards score for all values of N. If the reward score is low, control circuitry 310 proceeds to step 608, where the value of N is modified, and steps 602-604 are repeated for subsets with N categories (where the value of N is new).

When the reward score is sufficiently high, process 600 ends at 610. In some embodiments, the value of N that led to step 610 may be used by control circuitry 310 to generate the number of carousels to be displayed in a stack of carousels to be displayed on a user device (e.g., as shown in element 134 of FIG. 1, or on display 320).

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    selecting, from a database that stores items, a candidate plurality of items for presentation at a client device;
    determining a plurality of item categories for presentation at the client device;
    selecting a subset, of the candidate plurality of items, for presentation at the client device, wherein the subset comprises duplicative items, by:
        selecting, for each item category of the plurality of item categories, a respective subset of the candidate plurality of items, wherein:
            each respective subset has zero duplication; and
            a total amount of duplication of all items in all respective subsets is based on a score, wherein:
                the score decreases based on the total amount of duplication being below a duplication target; and the score decreases based on the total amount of duplication being above the duplication target;
    generating for presentation a user interface of the client device, wherein the user interface comprises a stack of rows, and wherein each respective row of the stack of rows comprises:
        a respective identifier of a respective item category of the plurality of item categories; and
        identifiers of the respective subset of the candidate plurality of items.

2. The method of claim 1, further comprising, based at least in part on the score and the plurality of item categories, determining a number of rows, in the stack of rows, to be simultaneously presented at the user interface of the client device.

3. The method of claim 1, wherein the stack of rows comprises duplicative identifiers between respective rows in the stack of rows.

4. The method of claim 1, wherein each of the identifiers comprises one or more images depicting a corresponding item of the respective subset.

5. The method of claim 4, wherein the one or more images comprise promotion materials for the corresponding item.

6. The method of claim 1, wherein each respective row of the stack of rows comprises a respective interface element on the user interface for scrolling the identifiers of the respective subset.

7. The method of claim 1, further comprising replacing one or more of the duplicative items in the subset with one or more non-duplicative items of the candidate plurality of items to modify the total amount of duplication of all items in all respective subsets.

8. The method of claim 1, wherein selecting, from the database that stores items, the candidate plurality of items for presentation at the client device comprises identifying, via an API call to a recommendation engine, recommended items from the database as part of the candidate plurality of items.

9. The method of claim 1, further comprising determining, based at least in part on a user profile associated with the client device, the duplication target.

10. The method of claim 1, wherein the subset, of the candidate plurality of items, for presentation at the client device is selected based in part on respective popularity scores of the candidate plurality of items.

11. A system comprising:
    control circuitry configured to:
        select, from a database that stores items, a candidate plurality of items for presentation at a client device;
        determine a plurality of item categories for presentation at the client device;
        select a subset, of the candidate plurality of items, for presentation at the client device, wherein the subset comprises duplicative items, by:
            select, for each item category of the plurality of item categories, a respective subset of the candidate plurality of items, wherein:
                each respective subset has zero duplication; and
                a total amount of duplication of all items in all respective subsets is based on a score, wherein:
                    the score decreases based on the total amount of duplication being below a duplication target; and
                    the score decreases based on the total amount of duplication being above the duplication target; and input/output circuitry configured to:

generate for presentation a user interface of the client device, wherein the user interface comprises a stack of rows, and wherein each respective row of the stack of rows comprises:

a respective identifier of a respective item category of the plurality of item categories; and identifiers of the respective subset of the candidate plurality of items.

12. The system of claim 11, wherein the control circuitry is further configured to, based at least in part on the score and the plurality of item categories, determine a number of rows, in the stack of rows, to be simultaneously presented at the user interface of the client device.

13. The system of claim 11, wherein the stack of rows comprises duplicative identifiers between respective rows in the stack of rows.

14. The system of claim 11, wherein each of the identifiers comprises one or more images depicting a corresponding item of the respective subset.

15. The system of claim 14, wherein the one or more images comprise promotion materials for the corresponding item.

16. The system of claim 11, wherein each respective row of the stack of rows comprises a respective interface element on the user interface for scrolling the identifiers of the respective subset.

17. The system of claim 11, wherein the control circuitry is further configured to:

replace one or more of the duplicative items in the subset with one or more non-duplicative items of the candidate plurality of items to modify the total amount of duplication of all items in all respective subsets.

18. The system of claim 11, wherein the control circuitry, when selecting, from the database that stores items, the candidate plurality of items for presentation at the client device, is configured to identify, via an API call to a recommendation engine, recommended items from the database as part of the candidate plurality of items.

19. The system of claim 11, wherein the control circuitry is further configured to determine, based at least in part on a user profile associated with the client device, the duplication target.

20. The system of claim 11, wherein the control circuitry is configured to select the subset, of the candidate plurality of items, for presentation at the client device based in part on respective popularity scores of the candidate plurality of items.

* * * * *